Feb. 17, 1931.   H. B. WALTHERS   1,793,200
AISLE LIGHT
Filed Oct. 10, 1929   2 Sheets-Sheet 1

Inventor
Harry B. Walthers.
By A. O'Brien
Attorney

Inventor
Harry B. Walthers.
By A. J. O'Brien
Attorney

Patented Feb. 17, 1931

1,793,200

UNITED STATES PATENT OFFICE

HARRY B. WALTHERS, OF CHICAGO, ILLINOIS

AISLE LIGHT

Application filed October 10, 1929. Serial No. 398,648.

This invention relates to improvements in lamps and has reference to the production of a glareless lamp for use in lighting theater aisles and for similar purposes.

It is the object of this invention to produce a nonglare lamp that can be used in any place and for any purpose where illumination is required, but which is particularly well adapted for use in moving picture and other theaters for illuminating the aisles without interfering with the general illumination. This improved lamp is also well adapted for lighting the inside of show windows, ornaments and bridle paths where a narrow streak of light is desired.

Moving picture and other theaters have, as a rule, no adequate illumination for the aisles with the result that these are dangerously dark and when patrons enter the theater from the outside they are unable to see the floor of the aisle until their eyes become adjusted to the semi-darkness. Serious accidents have occurred due to the inadequate illumination of theater aisles and it is therefore of great importance to properly illuminate them.

Where one hundred ten volts is employed for the lamps that are used to illuminate the aisles in theaters, the wiring regulations require the wires to be placed in conduits embedded in or laid under the cement floor; this makes the installations too expensive for small theaters that have already been constructed with the result that such theaters continue to operate without adequate aisle illumination. Even where small lamps are provided on the ends of the seats, they illuminate only a very small area of the floor.

It is an object of this invention to produce a lamp that can be operated on a voltage of eight volts and therefore the wires can be run above the floor and along the seats without the necessity of using conduits and in this way the expense of installation will be reduced. When low voltage is used small lamps can be employed and the light intensified by reflectors.

It is an object of this invention to produce a lamp of such construction that it can be placed at the rear of the theater and used to flood light the entire length of the aisle without producing glare or interfering with the general illumination.

This invention, briefly described, comprises a housing within which is located a parabolic reflector, a cover, or lense, is applied to the housing in front of the reflector, this cover may be of opaque material or of translucent glass and is provided with two openings. One of these openings is located below the center of the lens and the other is preferably located above the lamp. The lower opening is provided with tubular openings and is so located that it is in line with the maximum concentration of rays of light which pass through it and are projected forwardly as a thin narrow beam that covers the floor of the aisles with a uniform glareless light that makes it safe for the patrons to walk along the aisles to and from their chairs. The upper opening is shielded in such a manner that the light will be reflected onto the outer surface of the lens so as to make this visible when it is made from opaque material. The illumination of the lens also serves to reduce the brilliancy of the flood light and the upper opening further serves to produce an air circulation for ventilating purposes.

Having thus described the invention, the same will now be described in detail, and for this purpose reference will be had to the accompanying drawings in which the invention has been illustrated, and in which:

Fig. 1 is a front elevation of the improved illuminative device, a porion of the lens being broken away;

Fig. 2 is a section taken on line 2—2, Fig. 1;
Fig. 3 is a section taken on line 3—3, Fig. 2;
Fig. 4 is a section taken on line 4—4, Fig. 2;

Figure 1:
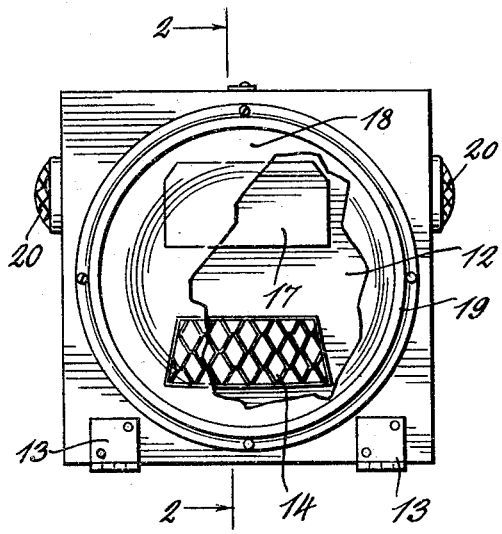
Figure 3:
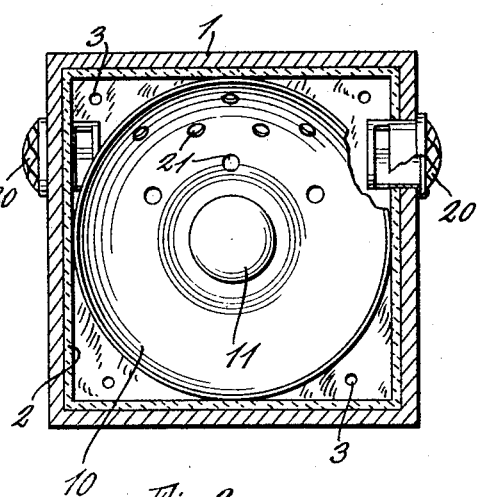
Figure 2:
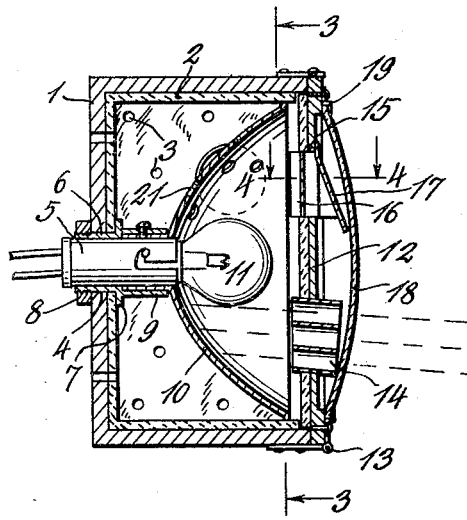
Figure 4:
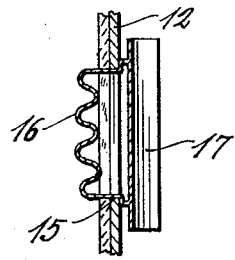
Figure 5:
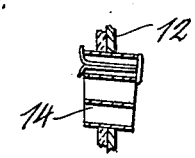
Fig. 5 is a fragmentary section similar to that shown in Fig. 2 and shows means for closing some of the light emitting openings.

In the drawing reference numeral 1 represents the housing in which my lamp and reflector are located. This housing has been shown as a square box having one side open. The inside of the housing is provided with an asbestos lining 2, and the walls are perforated as indicated at 3 so as to provide sufficient ventilation to maintain the temperature within reasonable limits. The bottom of the box or housing is provided with an opening 4, through which an electric light socket 5 extends. This socket is slidably mounted in the tubular guide member 6 that is provided with a flange 7, which rests against the inner surface of the bottom and whose outer end is provided with a threaded portion for the reception of the clamping nut 8. Secured to the inner end 9 of the guide member is a reflector 10, which in the example shown in Figs. 1, 2 and 3, is of the paraboloidal type. A lamp 11 is secured to the socket and is located within the reflector and has its filament at a point adjacent the focal point of the reflector. The open side of the housing is provided with a cover 12 which is connected with the housing by means of hinges 13. This cover is preferably made from opaque material, but may be made from any nontransparent material, such as translucent glass, or other translucent materials such as pyroxelene or celluloid. The inside of the cover like the inside of the housing is preferably lined with asbestos in the manner shown in Fig. 2. The cover is provided with an opening 14, which is located below the lamp in the manner shown in Figs. 1 and 2. This opening may be of any desired size and contains a section 14 which is preferably made of metal and which has a large number of small openings whose axes are parallel with each other. This section is of considerable thickness and therefore it serves to direct the light rays that pass through it. A reference to Fig. 2 will show that the tubular openings in section 14 are preferably downwardly and forwardly inclined so as to give the beam of light a downward inclination. The light from lamp 11 strikes the reflecting surface of the reflector and the inner surface of the cover and therefore produces an intense illumination within the lamp compartment. The light from the reflector will emerge through the openings in member 14, from which they will spread at a predetermined angle and the openings are so adjusted as to size and inclination that when the device is used for illuminating the aisles of a theater, a beam of light of sufficient width and thickness to completely illuminate the floor of the aisle is formed. The cover member is also preferably provided with another opening 15 which is located on the upper side of the lamp in the manner shown in Fig. 2. This opening has secured to its side a corrugated baffle plate 16, which is spaced a short distance from the rear of the asbestos lining of the cover, as most clearly shown in Fig. 4. This baffle prevents rays of light from projecting through the opening from the reflector surface directly back of it and therefore any light that passes through this opening must enter from above or from below and at a considerable angle. Secured to the cover directly above the opening 15 is an inclined reflector 17. This reflector has a forward and downward inclination and extends to a point below the opening 15, and therefore any light that passes outwardly through this opening will strike the inner surface of member 17 and be deflected downwardly in front of the cover or closure member so as to illuminate the latter. A concavo-convex lense 18 is preferably located in front of the member 14 and reflector 17 and is secured to the cover by means of a ring 19. This lens is merely for the purpose of protection and does not influence the optical properties of the illuminating device. The cover is held in closed position by means of a latch which may be a hook or any other suitable latching device. The two vertical sides of the lamp housing are provided with colored lenses 20 that are secured in suitable openings in the sides of the housing. The reflector is provided with a number of openings 21 through which light may pass into the interior of the housing and this light will cause the lenses 20 to glow so as to indicate the position of the illuminating device.

Figure 6:
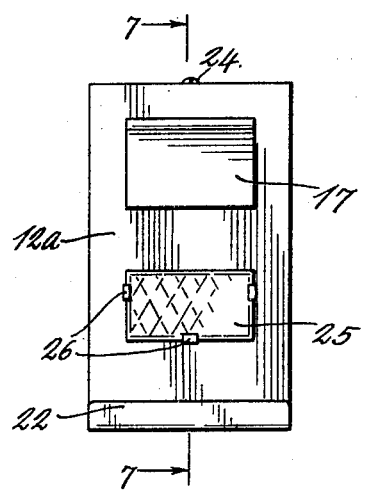
Fig. 6 is a front view of a slightly modified form of construction.
Figure 7:
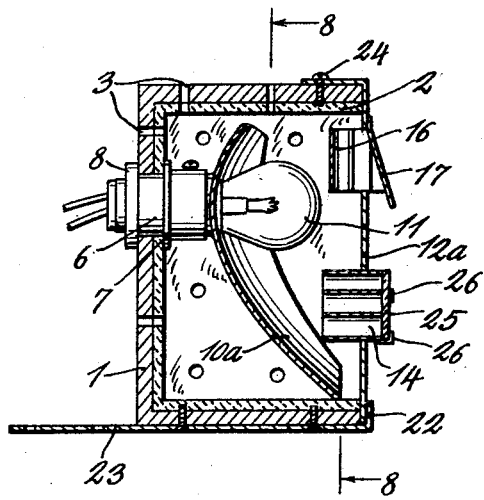
Fig. 7 is a section taken on line 7—7, Fig. 6.
Figure 8:
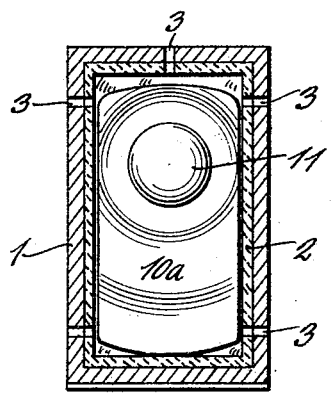
Fig. 8 is a section taken on line 8—8, Fig. 7.

In Figs. 6, 7 and 8, I have shown a modified form of construction which differs from the one explained above principally in this, that, the reflector instead of being a complete reflector as shown in the views already described, is merely a segment of a reflector. This segmental reflector has been designated by reference character 10a. But the device is otherwise substantially the same as the one already described. Instead of having a hinge cover, the corresponding element 12a is formed from a metal plate that is held in place along its lower edge by the upwardly extending flange 22 of the supporting member 23 and at its upper end by means of a screw 24. In this modified form of construction, the lens 18 has been dispensed with and the outer end of section 14 has been closed by means of a transparent glass plate 25, that is held in place by suitable clamping fingers 26 or other suitable means.

Figure 9:
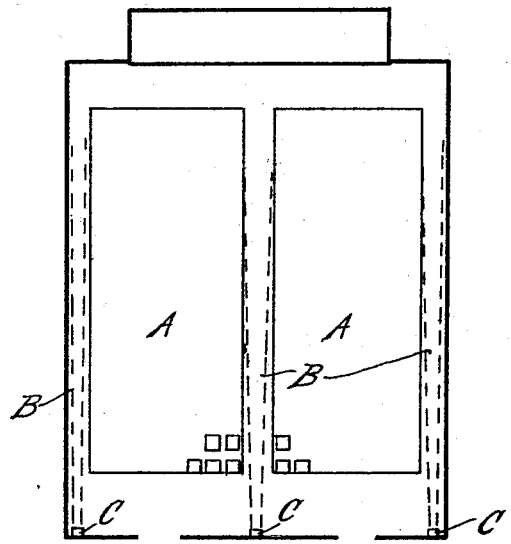
Fig. 9 is a plan view of a theater showing the same equipped with my improved illuminating devices.

I have already pointed out several uses to which this invention can be put and have intimated that it will find its greatest use in connection with the illumination of the aisles of theaters. In Fig. 9 I have shown a plan of a theater in which the two sections marked A are the seats and the parts marked B are the aisles to be illuminated. For the purpose of illuminating these aisles, I have provided one of my illuminating devices for each aisle. These devices have been indicated by letter C and are located at the back of the theater in line with the aisles so that the beam of light that emerges from them will be directed forwardly along the aisles and illuminate the floors in the manner already described.

As the theater is usually quite dark it is evident that it is desirable to have the illuminating devices provided with means that will indicate their position and for this purpose the colored lenses 20 have been provided. The object sought by illuminating the face of the device by means of light reflected onto it from the reflecting surface of member 17 is principally to make the device visible, as without this the outlines of the illuminating device could not have been seen in a dark room. In addition to this, the secondary flood lighting of this device serves to reduce any glare that might otherwise be produced, as it has been found that glare can be reduced by illuminating the outer surface of the light projector.

Although I have pointed out several uses to which this device can be put, I do not want to be limited to these uses as it is evident that this device may be found useful in other relations and for other purposes than those specified above.

Figure 10:
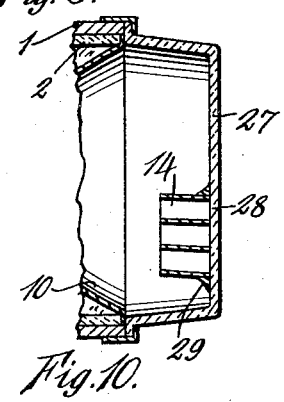
Fig. 10 is a section showing a slightly modified form of construction.

In Fig. 10 I have shown a slightly modified form of construction. In this form the flat cover 12 and the lens 18 have been replaced by an extended or dish-shaped lens 27 which may be made of material that is slightly translucent and which has a transparent section 28 or an opening corresponding to this section. The light directing member 14 is located to the rear of the lens and is attached thereto by some suitable means 29, such as cement.

Having thus briefly described the invention what is claimed as new is:

1. A lamp, for the purpose specified, comprising a reflector having a concave reflecting surface, a source of light located within the reflector, a nontransparent closure for the open end of the reflector, the closure having an opening located below the light source and another located above the light source, means located in the lower opening for determining the direction and angular dispersion of the light that emerges therethrough and means associated with the upper opening for reflecting light onto the outer surface of the closure.

2. A lamp for the purpose specified, comprising a reflector having a concave reflecting surface, a source of light located within the reflector, a nontransparent closure for the open end of the reflector, the closure having an opening located below the light source and another located above the light source, means located in the lower opening for determining the direction and angular dispersion of the light that emerges therethrough, a reflector secured at its upper edge to the closure at a point above the upper opening, said reflector extending downwardly and outwardly over the upper opening whereby light emerging from this opening will be directed downwardly in front of the closure.

3. A lamp for the purpose specified, comprising a reflector having a concave reflecting surface, a source of light located within the reflector, a nontransparent closure for the open end of the reflector, the closure having an opening located below the light source and another located above the light source, means located in the lower opening for determining the direction and angular dispersion of the light that emerges therethrough, a baffle plate extending across the upper opening and spaced from the inside of the closure whereby light rays can enter the opening from the sides of the baffle only, and a downwardly and outwardly inclined reflecting surface located in front of the upper opening whereby the light rays that emerge from the upper opening will be deflected downwardly and onto the front surface of the closure.

4. An illuminating device comprising, a housing, a paraboloidal reflector located within the housing, the concave surface of the reflector being polished, a source of light located adjacent the focus of the reflector, a nontransparent closure for the front end of the reflector and for the housing, said closure having an opening located below the optical axis of the reflector, the opening being subdivided into a plurality of elongated tubular openings through which the light must emerge and which determine the direction and the angular dispersion of the light, and means for illuminating the front surface of the closure.

5. An illuminating device comprising, a housing, a paraboloidal reflector located within the housing, the concave surface of the reflector being polished, a source of light located adjacent the focus of the reflector, a nontransparent closure for the front end of the reflector and for the housing, said closure having an opening located below the optical axis of the reflector, the opening being subdivided into a plurality of elongated tubular openings through which the light must emerge and which determine the direction and the angular dispersion of the light, the closure having another opening which is located near the edge of the reflector, and an inclined reflector located in front of this opening.

In testimony whereof I affix my signature.

HARRY B. WALTHERS.